(12) United States Patent
Gatti et al.

(10) Patent No.: US 9,302,762 B2
(45) Date of Patent: Apr. 5, 2016

(54) PITCHING STABILIZATION MEANS AND A ROTARY WING AIRCRAFT INCLUDING SUCH MEANS

(71) Applicant: AIRBUS HELICOPTERS, Marignane, Cedex (FR)

(72) Inventors: Jean-Loup Gatti, Marseille (FR); Remy-Elian Arnaud, Vitrolles (FR)

(73) Assignee: Airbus Helicopters, Marignane (FR)

( * ) Notice: Subject to any disclaimer, the term of this patent is extended or adjusted under 35 U.S.C. 154(b) by 514 days.

(21) Appl. No.: 13/890,385

(22) Filed: May 9, 2013

(65) Prior Publication Data

US 2013/0313355 A1     Nov. 28, 2013

(30) Foreign Application Priority Data

May 22, 2012  (FR) ...................................... 12 01447

(51) Int. Cl.
*B64C 5/00* (2006.01)
*B64C 27/82* (2006.01)

(52) U.S. Cl.
CPC . *B64C 5/00* (2013.01); *B64C 27/82* (2013.01); *B64C 2027/8281* (2013.01); *B64C 2230/20* (2013.01); *Y02T 50/166* (2013.01)

(58) Field of Classification Search
CPC .............. B64C 2027/8263; B64C 2027/8272; B64C 2027/8281; B64C 2027/829; B64C 2230/20; B64C 2230/22; B64C 27/26; B64C 27/82; B64C 29/0016; B64C 29/0025; B64C 29/0033; B64C 5/02; B64C 5/18
See application file for complete search history.

(56) References Cited

U.S. PATENT DOCUMENTS

| 1,822,179 | A | * | 9/1931 | Thomas | 244/6 |
|---|---|---|---|---|---|
| 1,913,169 | A | * | 6/1933 | Martin | 244/198 |
| 2,406,475 | A | * | 8/1946 | Rogers | 244/210 |
| 2,464,663 | A | | 3/1949 | Zingg | |
| 2,575,886 | A | * | 11/1951 | Myers | 244/6 |
| 3,281,095 | A | * | 10/1966 | Runge | 244/204 |
| 3,506,219 | A | | 4/1970 | Mouille et al. | |
| 3,545,701 | A | * | 12/1970 | Bertin et al. | 244/12.3 |

(Continued)

FOREIGN PATENT DOCUMENTS

| EP | 2409917 A1 | 1/2012 |
|---|---|---|
| FR | 56121 E * | 9/1952 |

(Continued)

OTHER PUBLICATIONS

Search Report and Written Opinion; Application No. FR 1201447; dated Jan. 14, 2013.

*Primary Examiner* — Philip J Bonzell
*Assistant Examiner* — Michael Kreiner
(74) *Attorney, Agent, or Firm* — Brooks Kushman P.C.

(57) ABSTRACT

A pitching stabilization means has at least one stationary stabilization surface extending in a thickness direction from a bottom face to a top face and in a transverse direction from a leading edge towards a trailing edge. The stabilization surface has at least one slot passing through the thickness of the stabilization surface from the top face to the bottom face. The slot is arranged within the stabilization surface between the leading edge and the trailing edge so as to allow a flow of air coming from a rotor to pass from the top face towards the bottom face.

17 Claims, 3 Drawing Sheets

(56) References Cited

U.S. PATENT DOCUMENTS

| | | | |
|---|---|---|---|
| 3,583,659 A | | 6/1971 | Lermusiaux |
| 3,612,446 A | * | 10/1971 | Lebert .......................... 244/35 R |
| 3,664,611 A | * | 5/1972 | Harris ............................ 244/207 |
| 3,902,688 A | | 9/1975 | Seibel et al. |
| 4,227,665 A | | 10/1980 | Carlson et al. |
| 4,828,203 A | | 5/1989 | Clifton et al. |
| 4,928,907 A | * | 5/1990 | Zuck ................................ 244/6 |
| 5,388,785 A | * | 2/1995 | Rollet et al. ................ 244/17.19 |
| 6,352,220 B1 | | 3/2002 | Banks et al. |
| 2006/0157614 A1 | * | 7/2006 | Simpson ............................ 244/6 |
| 2008/0230656 A1 | * | 9/2008 | Kretchmer ................ B64C 3/38 244/7 R |

FOREIGN PATENT DOCUMENTS

| | | | |
|---|---|---|---|
| FR | 1511006 A | | 12/1967 |
| FR | 2864026 A1 | | 6/2005 |
| GB | 423565 A | * | 2/1935 |
| GB | 703067 A | * | 1/1954 |
| WO | 2011034531 A1 | | 3/2011 |

* cited by examiner

PITCHING STABILIZATION MEANS AND A ROTARY WING AIRCRAFT INCLUDING SUCH MEANS

CROSS REFERENCE TO RELATED APPLICATIONS

This application claims priority to French patent application No. FR 12 01447 filed on May 22, 2012, the disclosure of which is incorporated in its entirety by reference herein.

BACKGROUND OF THE INVENTION (1) Field of the Invention

The present invention relates to pitching stabilization means and to a rotary wing aircraft provided with such pitching stabilization means, in particular to minimize the attitude hump phenomenon. The invention is thus situated in the narrow technical field of aircraft that are subjected to the attitude hump phenomenon.

(2) Description of Related Art

Conventionally and by way of example, a helicopter comprises an airframe extending longitudinally from a front end towards a tail end on either side of an anteroposterior plane of symmetry, and in a vertical direction from a bottom portion fitted with landing gear to a top portion fitted with a main rotor for providing lift and propulsion.

Furthermore, the airframe includes a tail rotor at its tail end. A particular function of the tail rotor is to oppose the yaw torque exerted by the main rotor on the airframe. The tail rotor also enables yaw movements of the helicopter to be controlled.

A helicopter sometimes also includes additional stabilizer surfaces. For example, it is common practice to fit a helicopter with a yaw stabilizer surface, e.g. contained in the anteroposterior plane, in order to oppose said yaw torque at high forward speeds of the aircraft.

Such a yaw stabilizer surface is sometimes referred to as a "fin".

Likewise, a helicopter sometimes includes pitching stabilization means presenting an angle of absolute value lying in the range 0° and plus or minus 90° relative to said anteroposterior plane, the pitching stabilization means comprising, by way of example, two pitching stabilizer surfaces extending symmetrically on either side of said anteroposterior plane.

Such pitching stabilization means are sometimes referred to as a "horizontal stabilizer" or more simply as a "stabilizer". The term "stabilizer" is frequently used on its own given that the stabilization means are not necessarily horizontal.

The pitching stabilization means are very effective, with their effectiveness increasing with increasing forward speed of the helicopter. Furthermore, it can be understood that the effectiveness of pitching stabilization means is maximized by maximizing their wing area.

However, the flow of air passing through the main rotor of a traditional helicopter in flight is deflected towards the tail and impacts against the pitching stabilization means, in particular when moving at a slow speed in translation or when hovering. This flow of air then exerts forces on the pitching stabilization means that the pilot compensates by operating the flight controls.

Nevertheless, when conditions of flight vary, the deflection of the airstream is also modified. The same therefore applies to the forces exerted on the pitching stabilization means.

This phenomenon is referred to as the "attitude hump".

During a stage of acceleration or of deceleration, the forces exerted by the flow of air passing through the main rotor and impacting against the pitching stabilization means tend to cause the helicopter's nose to rise. In order to stabilize the speed of the helicopter, the pilot then needs to use the cyclic pitch control stick to control the blades of the main rotor in order to diminish the nose-up attitude of the helicopter.

It can be understood that optimize the pitching stabilization means by maximizing their wing area makes the attitude hump worse.

Under such circumstances, it appears to be impossible to use pitching stabilization means having large wing area on a helicopter without giving rise to an increase in the attitude hump phenomenon.

In order to remedy that, stabilization means are known having a stationary stabilization surface and a movable surface. The position of the movable surface relative to the stationary stabilization surface can then be controlled using flight controls in order to limit the attitude hump phenomenon.

Although advantageous, that configuration needs flight controls, thereby giving rise to an increase in the weight of the aircraft, and also to increased complexity of the aircraft.

A second solution consists in arranging pitching stabilization means for a rotary wing aircraft outside the wake of the rotary wing. Nevertheless, that second solution can in fact lead to a significant loss in the effectiveness of the stabilization means.

For this purpose, document FR 1 511 006 describes an aircraft having a rotary wing and a horizontal stabilizer that is arranged at the top of a fin.

An object of the present invention is thus to propose pitching stabilization means for a rotary wing aircraft seeking to minimize the attitude hump phenomenon.

In the technological background remote from the technical field of the invention and the technical problem of minimizing the attitude hump phenomenon, high-lift flaps are known.

A wing conventionally has a stationary airfoil surface. Certain airplanes then include firstly a stationary airfoil surface and secondly high-lift flaps that extend the airfoil surface in the forward direction of the airplane in order to minimize the stalling speed of the airplane.

Each high-lift flap is movable to allow air to pass between the stationary airfoil surface and the flap.

Document FR 2 864 026 relates to a method and a device for reducing the vibration that is generated on the structure of a helicopter by the air flow coming both from the main rotor that provides the aircraft with lift and propulsion and from the flow of air along the fuselage.

Document U.S. Pat. No. 3,902,688 describes an aircraft having a horizontal stabilizer arranged at the top of a fin, and a horizontal stabilizer arranged at the bottom of the fin.

Document U.S. Pat. No. 3,583,659 describes a helicopter having a tail rotor.

The helicopter has a fairing constituted by a plurality of mutually parallel stationary rings.

Document U.S. Pat. No. 4,828,203 describes an aircraft provided with:

a fuselage;

a set of canard foils fastened to the fuselage in front of the center of gravity of the aircraft;

a set of lift-providing ducted rotors attached to the fuselage level with said center of gravity; and a fixed wing fastened to the fuselage behind the center of gravity of the aircraft.

Under such circumstances, that document is remote from the invention because it relates to a fixed wing aircraft and not a rotary wing aircraft. In addition, the ducted rotors are not stabilizer type pitching stabilization means, but members provided with propulsion means.

The term "pitching stabilization means" is used herein to mean passive means not having a fan or an engine.

Document U.S. Pat. No. 4,227,665 describes a stabilization surface including a slot.

The following documents are also known: EP 2 409 917, WO 2011/034531, U.S. Pat. No. 6,352,220, and U.S. Pat. No. 2,464,663.

BRIEF SUMMARY OF THE INVENTION

In this context and according to the invention, pitching stabilization means are provided with at least one stationary stabilization surface extending in a thickness direction from a bottom face to a top face and in a longitudinal direction from a leading edge towards a trailing edge.

The term "longitudinally" refers to the direction in which an aircraft extends longitudinally from its nose towards its tail end.

The terms "top" and "bottom" should be considered when the pitching stabilization means are arranged on an aircraft standing on the ground, in particular. In the context of a lift-reducing stabilizer, the "top face" may represent the pressure side of the stabilizer, while the "bottom face" represents its suction side.

This stabilization means is remarkable in particular in that the stabilization surface includes at least one slot passing through the thickness of the stabilization surface from the top face towards said bottom face, the slot being arranged within the stabilization surface between the leading edge and the trailing edge so as to allow a flow of air coming from a rotor to pass from the top face towards the bottom face of the stabilization surface.

Thus, in particular, the stabilization means do not have a fan or a rotor.

In fast forward flight, the flow of air travels from the leading edge towards the trailing edge of the stabilization surface. More precisely, the flow of air flows along the top face and along the bottom face of the stabilization surface. Nevertheless, a fraction of the flow of air that is flowing along the top face passes through the slot in the stabilization surface and then flows along the bottom face of the stabilization surface.

However, the slots do not significantly harm the efficiency of the stabilization means in terms of providing a vehicle with pitching stabilization.

At a slow speed of advance or while hovering the flow of air impacts against the top face of the stabilization surface, the stabilization surface thereby giving rise to a loss of lift. However, a fraction of this flow of air passes through the stabilization surface via the slots.

Under such circumstances, the loss of lift that is generated is minimized. It is explained below that the equivalent area to be taken into consideration from a loss-of-lift point of view may be about half the area to be taken into consideration in fast forward flight from a pitching-stabilization point of view.

In addition, the stabilization surface includes at least one deflector for deflecting the stream of air passing through the slot, each deflector extending between the bottom face and the top face along the span of the airfoil surface in order to separate the slot into two compartments.

The deflectors serve to optimize the flow of air through the slot.

During fast forward flight, the deflectors possibly tend to increase the lift of the stabilization surface by minimizing separation of the boundary layer.

In addition, while lying at low speed, the deflectors can contribute to the aerodynamic stalling of the stabilization surface.

Thus, depending on the embodiment, each slot is either completely hollow, or else provided with at least one airstream deflector. However, the airfoil surface does not contain any rotor within a slot. The stabilization surface therefore cannot be thought of as a rotor fairing.

The invention thus makes it possible to obtain pitching stabilization means for a rotary wing aircraft that are capable of minimizing the attitude hump phenomenon.

Furthermore, the invention is easy to implement and can have limited impact on an aircraft, e.g. in terms of weight.

The stabilization means may also include one or more of the following characteristics.

Thus, the stabilization surface may be an openwork airfoil surface. The airfoil surface thus presents openings defining the slots.

In a first variant, a deflector may comprise a plane plate. This makes it easier to fabricate the deflector and the stabilization means.

In a second variant, the deflector presents an airfoil profile, the deflector having a pressure side surface facing towards the trailing edge of the stabilization surface and a suction side surface facing towards the leading edge of the stabilization surface.

It should be understood that the terms "pressure side" and "suction side" designate respectively the pressure side and the suction side of the stabilization surface, and "pressure side surface" and "suction side surface" designate respectively the pressure side and the suction side of an airfoil deflector.

This characteristic seeks to optimize control over the airstreams. Furthermore, the aerodynamic chord of the deflector at constant lift may be made smaller, thereby achieving a weight saving.

The first and second variants may be combined. For example, a slot may include both at least one plane deflector and at least one profiled deflector.

In another aspect, when the stabilization means have a plurality of deflectors, the deflectors may optionally be parallel to one another.

In the context of a deflector having an airfoil profile, the plane connecting the leading edge to the trailing edge of one deflector may for example be parallel to the plane connecting the leading edge to the trailing edge of another deflector.

Furthermore, the stabilization means may include orientation means for orienting at least one deflector so that the deflector is movable.

Adjusting the deflectors makes it possible to influence the lift center of the stabilization surface. Under such circumstances, changing the orientation of the deflectors relative to one another may serve artificially to increase or decrease the lever arm ratio of a first distance between the center of gravity of an aircraft and the center of thrust of the aircraft, and of a second distance between the center of thrust and the lift center of the stabilization surface.

This version of the invention is more complex because of the presence of the orientation means. The orientation means may include a motor controlled by a control member. Nevertheless, this version presents the advantage of being capable of inclining the deflectors in order to optimize their positions relative to the incident air flow.

By way of example, it is possible to close the slot during forward flight in order to cause the behavior of the stabilization means of the invention to approach the behavior of conventional stabilization means.

The deflectors cannot be thought of as as high-lift flaps insofar as the deflectors perform another function, and furthermore they are arranged inside the stabilization surface, unlike high-lift flaps, which extend outside a wing.

Furthermore, the stabilization means may include means for adjusting the angle of incidence of the airfoil stabilization surface relative to an airframe.

Adjustment means may comprise a motor suitable for varying the angle of inclination of a stabilization surface relative to an air flow, or indeed a deflector flap, for example. Reference may be made to the literature in order to obtain information about means for varying the angle of inclination of an airfoil surface in flight.

In addition to providing pitching stabilization means, the invention provides an aircraft having an airframe extending longitudinally from a nose towards a tail end, the aircraft having a rotary wing carried by the airframe between said nose and said tail end, the aircraft having stabilization means carried by the airframe between the tail end and the rotary wing.

That aircraft then includes stabilization means of the above-described type.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements that are present in more than one of the figures are given the same references in each of them.

DETAILED DESCRIPTION OF THE INVENTION

Three mutually orthogonal directions X, Y, and Z are shown in the figures. The direction X is said to be longitudinal. The term "longitudinal" relates to a longitudinal direction of the structures described in said longitudinal direction X.

Another direction Y is said to be transverse.

Finally, a third direction Z is said to be in elevation and corresponds to the height dimensions of the structures described. The term "thickness" then relates to a dimension in elevation of the structures described in this direction in elevation.

The X, Z plane represents the anteroposterior plane of symmetry of the aircraft shown.

Figure 1:
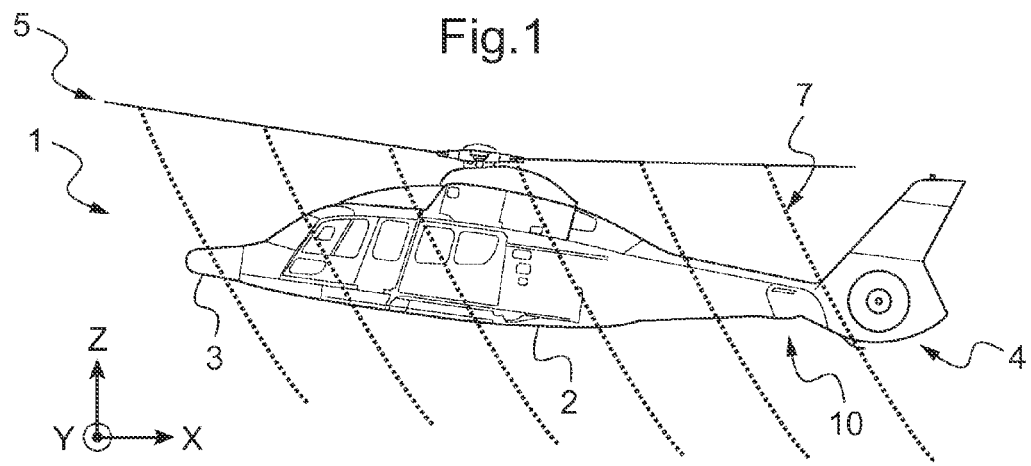
FIGS. 1 and 2 are diagrams showing an aircraft of the invention and explaining the problem.
Figure 2:
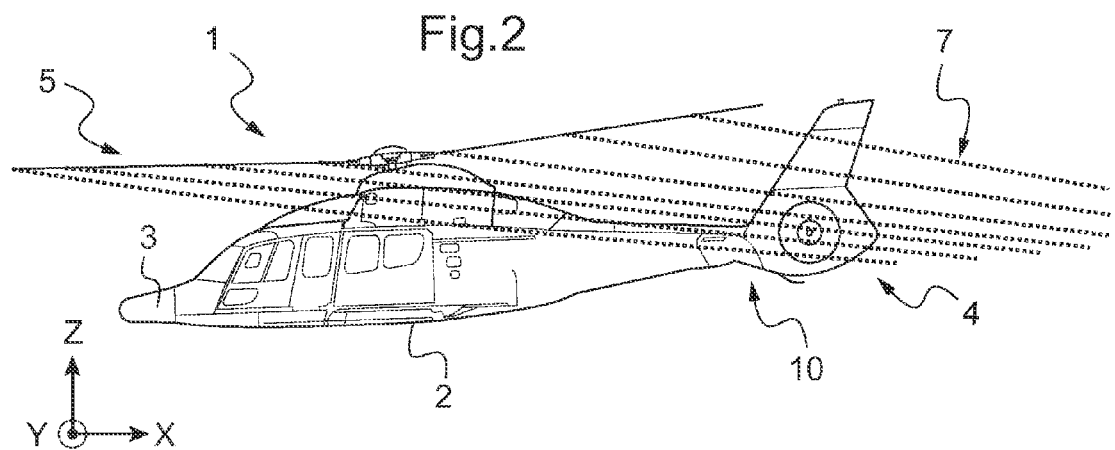

FIGS. 1 and 2 show a rotary wing aircraft 1.

With reference to FIG. 1, the aircraft 1 has an airframe 2 extending longitudinally from a nose 3 to a tail end 4. The airframe 2 carries a rotary wing 5 having a lift rotor that is arranged between the nose 3 and the tail end 4.

The rear end 4 is also provided with a tail rotor for controlling the yaw movements of the aircraft 1.

The aircraft 1 includes pitching stabilization means 10 arranged between the rotary wing 5 and the tail end 4. The wing area of the stabilization means 10 is maximized in order to optimize its effectiveness.

At low speed, i.e. when the forward speed of the aircraft is less than a predetermined speed, e.g. equal to 60 knots, i.e. about 30.8 meters per second, the flow of air 7 passing through the rotary wing 5 impacts against the top face of the stabilization means 10.

Conversely, at high speed, this flow of air 7 can flow on either side of the stabilization means 10.

This variable impact of the flow of air 7 on the stabilization means 10 lies at the origin of an "attitude hump" phenomenon on a conventional aircraft.

Figure 3:
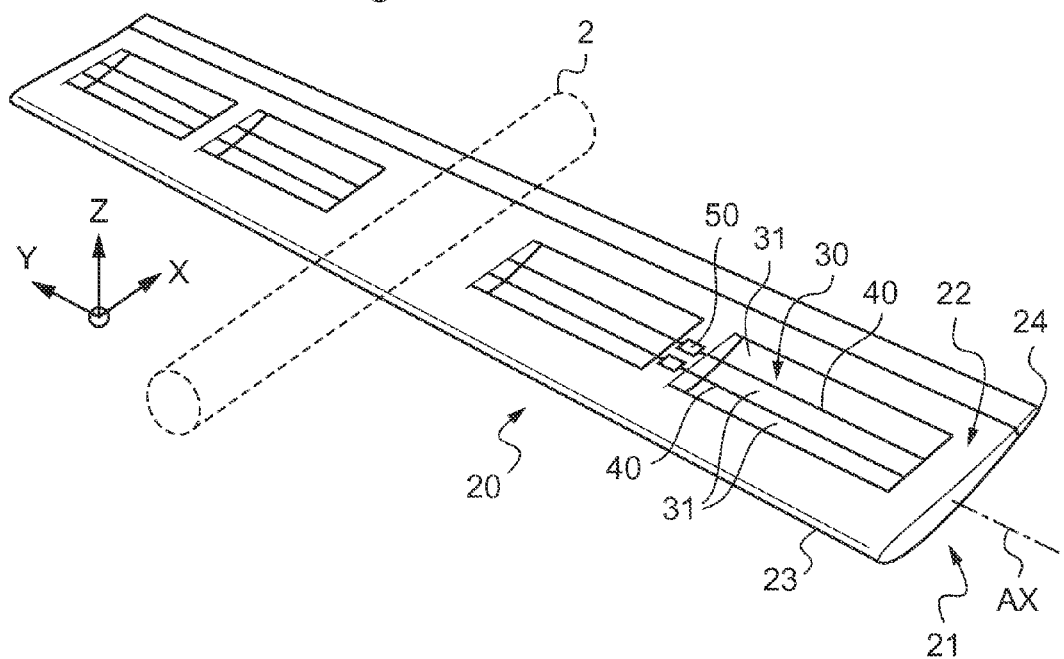
FIG. 3 shows an embodiment of pitching stabilization means provided with a single stabilization surface.

Nevertheless, with reference to FIG. 3, the invention relates to novel pitching stabilization means 10, such as a stabilizer of a rotary wing aircraft.

The stabilization means 10 include at least one stabilization surface 20 suitable for being fastened to the airframe 2 of a rotary wing aircraft.

For example, in the embodiment of FIG. 3, the stabilization means 10 comprise a single stabilization surface 20 passing transversely through the airframe 2 in order to extend on either side of the airframe 2.

This stabilization surface may also extend from the airframe 2 on one side only of the aircraft.

Figure 4:
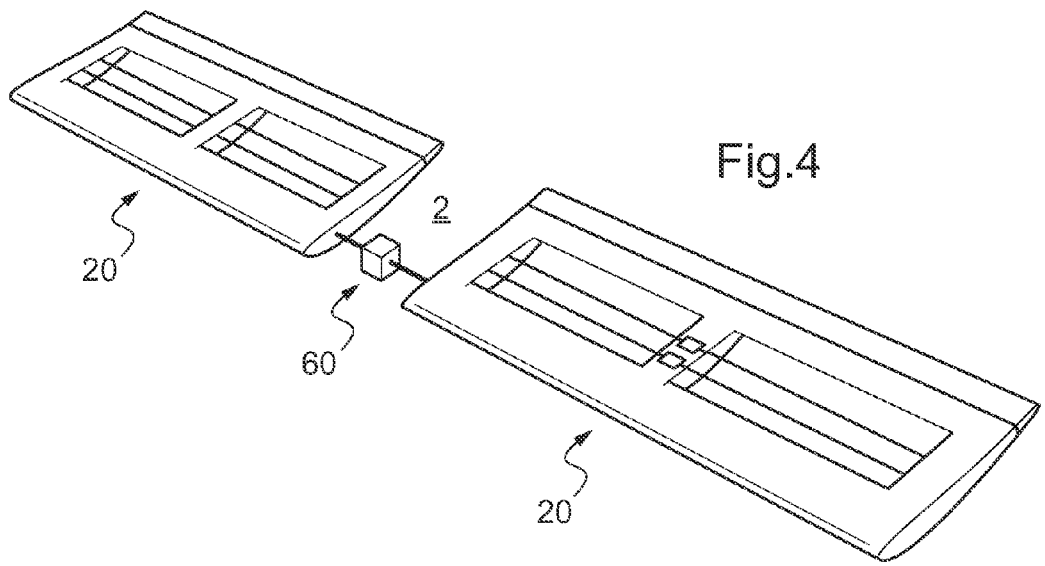
FIG. 4 shows an embodiment of pitching stabilization means provided with two stabilization surfaces.

In the embodiment of FIG. 4, the stabilization means 10 comprise two stabilization surfaces 20 extending transversely from opposite sides of the airframe 2.

Independently of the embodiment, and with reference to FIG. 3, each stabilization surface 20 extends longitudinally from a leading edge 23 to a trailing edge 24, in elevation from a bottom face 21 to a top face 22, and transversely along its span. The top face 22 is then above the bottom face 21 when an aircraft is standing on the ground.

Under such circumstances, each stabilization surface 20 includes at least one slot 30. Each slot 30 passes through the stabilization surface 20 in its thickness direction, somewhere between the leading edge 23 and the trailing edge 24 of the stabilization surface.

Consequently, air can pass through the stabilization surface by passing in succession through the top face 22, a slot 30, and the bottom face 21. Each slot thus represents an opening allowing the flow of air to pass through the thickness of the airfoil surface.

The stabilization surface is then an openwork airfoil surface.

Furthermore, each slot may be totally hollow.

Nevertheless, in the version shown, each slot may receive at least one deflector 40.

Each deflector 40 extends in the span direction of the stabilization surface, e.g. parallel to the leading edge 23.

In addition, each deflector 40 extends within a slot between the bottom face 21 and the top face 22 of the airfoil surface in order to define two distinct compartments 31 of the slot. Each deflector may extend in elevation from the bottom face 21 towards the top face 22.

The stabilization means 10 optionally include orientation means 50 for orienting each deflector 40 in the slot. The orientation means may include at least one motor suitable for causing at least one deflector to turn about a transverse axis AX.

In addition, with reference to FIG. 4, the stabilization means may include adjustment means 60 for adjusting the angle of incidence of each stabilization surface 20.

Figure 5:
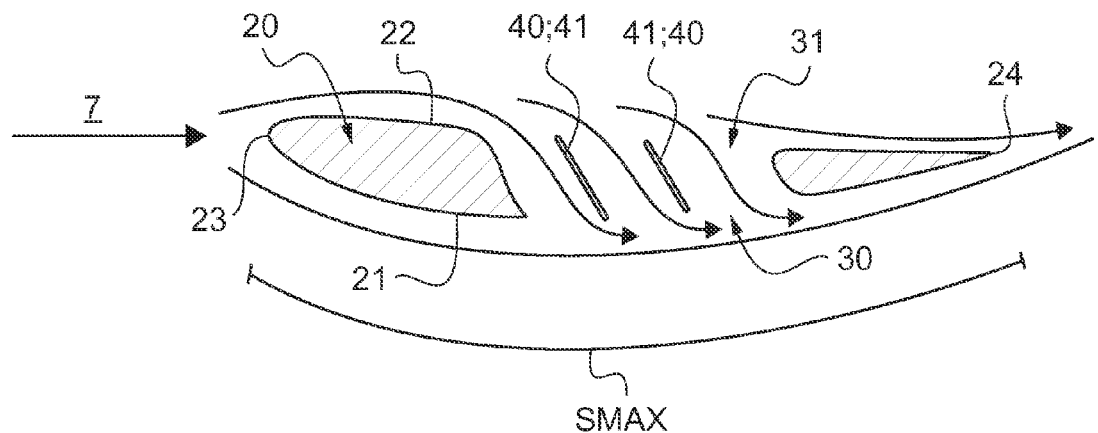
FIGS. 5 and 6 are diagrams explaining the invention on the basis of a first variant.
Figure 6:
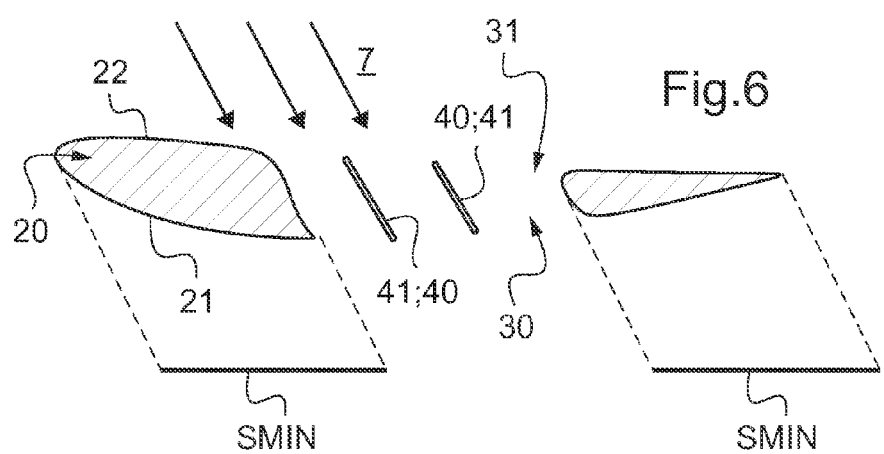

Furthermore, in a first variant as shown in FIGS. 5 and 6, at least one deflector 40 includes a plane plate 41. This configuration is then relatively simple to fabricate.

Figure 7:
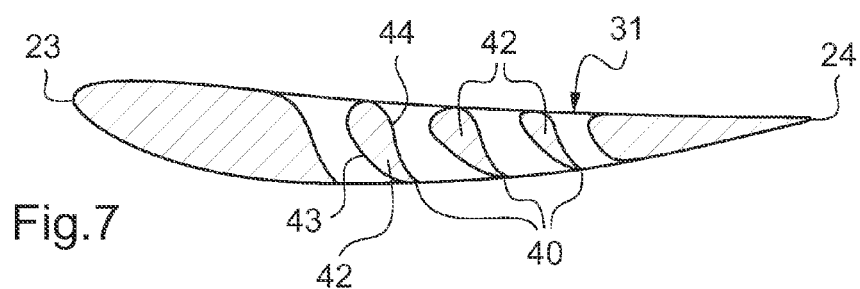
FIG. 7 is a diagram presenting a second variant of the invention.

In the second variant as shown in FIG. 7, at least one deflector 40 presents an airfoil profile 42. This deflector 40 then has a pressure side surface 43 that faces towards the trailing edge 24 of the stabilization surface 20, and a suction side surface 44 that faces towards the leading edge 23 of the stabilization surface 20.

Independently of the variant, and with reference to FIG. 5, during forward flight at relatively high speed, the incident air stream impacting against each of the airfoil surfaces flows along the bottom face 21 and the top face 22 of the airfoil surface.

Furthermore, a fraction of the air flow traveling along the top face 22 passes through the slot 30 in order to continue to the trailing edge beside the bottom face 21. It should be observed that in one version, the deflectors 41 are operated so as to close the slot 31 and prevent this flow of air from the top face towards the bottom face.

In forward flight at high speed, the lift generated by the stabilization means in order to provide the aircraft with pitching stabilization depends on a maximum reference surface area SMAX. This maximum reference surface area SMAX is substantially equal to the wing area that the stabilization means would have in the absence of slots.

In contrast, independently of the variant and with reference to FIG. 6, during forward flight at low speed or during hovering flight, the flow of air coming from the rotary wing impacts against the top face of each of the airfoil surfaces.

A fraction of the air flow nevertheless passes through the slots of the stabilization means. The loss of lift generated by the stabilization means then depends on the minimum reference surface area SMIN. This minimum reference surface area SMIN is equal to the maximum reference surface area SMAX minus the area occupied by the slots in the top face 22.

Under such circumstances, the surface area generating a harmful loss of lift during certain stages of flight may be of the order of half of the area generating favorable lift during other stages of flight.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. Pitching stabilization means for a rotary wing aircraft having at least one stationary stabilization surface extending in a thickness direction from a bottom face to a top face and in a longitudinal direction from a leading edge towards a trailing edge, at least one of the stabilization surfaces having at least one slot passing through the thickness of the stabilization surface from the top face to the bottom face, the slot being arranged within the stationary stabilization surface between the leading edge and the trailing edge so as to allow a flow of air coming from a rotor to pass from the top face towards the bottom face, wherein the at least one of the stationary stabilization surfaces includes at least one deflector for deflecting a stream of air passing through the slot, each deflector extending between the bottom face and the top face along the span of the airfoil surface in order to separate the slot into two compartments;

wherein the deflector presents an airfoil profile, the deflector having a pressure side surface facing towards the trailing edge of the at least one of the stabilization surfaces and a suction side surface facing towards the leading edge of the at least one of the stabilization surfaces; and wherein the at least one slot remains open to the flow of air therethrough through a full range of motion of the at least one deflector.

2. Pitching stabilization means according to claim 1, wherein the at least one of the stabilization surfaces is an openwork airfoil surface.

3. Pitching stabilization means according to claim 1, wherein the stabilization means include orientation means for orienting at least one deflector so that the deflector is movable.

4. Pitching stabilization means according to claim 1, wherein the stabilization means include a plurality of deflectors, the deflectors of a slot being parallel to one another.

5. An aircraft having an airframe extending longitudinally from a nose towards a tail end, the aircraft having a rotary wing carried by the airframe between the nose and the tail end, the aircraft including stabilization means carried by the airframe between the tail end and the rotary wing, and wherein the stabilization means are stabilization means according to claim 1.

6. Pitching stabilization means according to claim 1, wherein the pressure side surface is positioned between the suction side surface and the leading edge of the stabilization surface.

7. Pitching stabilization means for a rotary wing aircraft having at least one stationary stabilization surface extending in a thickness direction from a bottom face to a top face and in a longitudinal direction from a leading edge towards a trailing edge, the at least one stabilization surface having at least one slot passing through the thickness of the stabilization surface from the top face to the bottom face, the slot being arranged within the stabilization surface between the leading edge and the trailing edge so as to allow a flow of air coming from a rotor to pass from the top face towards the bottom face, wherein the at least one stationary stabilization surface includes at least one deflector for deflecting a stream of air passing through the slot, each deflector extending between the bottom face and the top face along the span of the airfoil surface in order to separate the slot into two compartments;

wherein the stabilization means include orientation means with a motor for orienting at least one deflector so that the deflector is movable; and wherein the at least one slot remains open to the flow of air therethrough through a full range of motion of the at least one deflector.

8. Pitching stabilization means according to claim 7, wherein the deflector comprises a plane plate.

9. A pitch stabilizer for a rotary wing aircraft comprising:

a stationary stabilization surface having an airfoil surface extending in a thickness direction from a bottom face to a top face and in a longitudinal direction from a leading edge towards a trailing edge, the stabilization surface defining a slot passing through the stabilization surface from the top face to the bottom face, the slot arranged between the leading edge and the trailing edge so as to allow a flow of air coming from a rotor to pass from the top face towards the bottom face; and a deflector supported within the slot and extending between the bottom face and the top face along a span of the stabilization surface to separate the slot into two compartments, the deflector configured to deflect a stream of air passing through the slot;

wherein the deflector is formed by an airfoil profile with a pressure side surface and a suction side surface, the pressure side surface positioned between the suction side surface and the leading edge of the stabilization surface; and wherein the slot remains open to the flow of air therethrough through a full range of motion of the deflectors.

10. The pitch stabilizer according to claim 9 wherein the pressure side surface is a convex surface, and wherein the suction side surface is a concave surface.

11. A rotary wing aircraft having an airframe extending longitudinally from a nose towards a tail end, the aircraft having a rotary wing carried by the airframe between the nose and the tail end, the aircraft comprising a tail plane provided by the pitch stabilizer according to claim 10.

12. The pitch stabilizer according to claim 9 wherein the airfoil profile of the deflector is bounded by the top face and the bottom face of the stabilization surface when the flow of air is traveling through the slot.

13. The pitch stabilizer according to claim 9 wherein the pressure side surface faces towards the trailing edge of the stabilization surface and the suction side surface faces towards the leading edge of the stabilization surface.

14. The pitch stabilizer according to claim 9 further comprising a motor configured to move and orient the deflector within the slot of the stationary stabilization surface thereby controlling a position of the deflector relative to the flow of air.

15. The pitch stabilizer according to claim 9 further comprising a second deflector supported within the slot and extending between the bottom face and the top face along the span of the stabilization surface, the deflector configured to deflect the stream of air passing through the slot, the deflector formed by an airfoil profile.

16. The pitch stabilizer according to claim 15 wherein each deflector has a plane connecting a leading edge of the deflector to a trailing edge of the deflector, the planes of the deflectors being parallel to one another.

17. The pitch stabilizer according to claim 15 further comprising at least one motor and a control member configured to move and orient the first and second deflectors thereby controlling a position of each deflector relative to the flow of air;

wherein the control member is configured to control the orientation of one deflector relative to the other deflector to control a lift center of the stabilization surface.

* * * * *